Patented Dec. 16, 1952

2,622,097

UNITED STATES PATENT OFFICE 2,622,097

PURIFICATION OF ACRYLONITRILE

Jacqueline Osborne, New Rochelle, N. Y., assignor to American Cyanamid Company, New York, N. Y., a corporation of Maine No Drawing. Application November 13, 1950, Serial No. 195,477

5 Claims. (Cl. 260—465.9)

This invention relates to the preparation of arcylonitrile from ethylene cyanohydrin and more particularly, to the purification of acrylonitrile prepared by dehydration of ethylene cyanohydrin.

The purification of acrylonitrile by the use of ion exchange materials in conjunction with neutral decolorizing agents is described in the Blann U. S. Patent No. 2,444,589. According to the teaching of this patent, dilute solutions of acrylonitrile in water, i. e., of the order of 7% acrylonitrile, are treated first with a pair of ion exchange materials comprising a cation exchange material and an anion exchange material in that order and then with a bed of neutral decolorizing material. It was found that the use both of decolorizing agent and of at least one pair of ion exchangers was necessary and moreover, that treatment with the ion exchangers must precede treatment with the decolorizing agent if a pure water-white product were to be obtained.

Acrylonitrile may be prepared by reaction of ethylene oxide and hydrogen cyanide followed by dehydration of the ethylene cyanohydrin produced. The acrylonitrile so formed, which is in concentrated form, is customarily purified by a plurality of acid and alkali washes. Attempts to apply the above-described Blann process to the purification of so-prepared acrylonitrile were not particularly satisfactory, however, because the concentrated acrylonitrile tends to undergo polymerization under the conditions of the patented purification procedure.

It is an object of the present invention to provide a process for the purification of concentrated acrylonitrile as prepared from ethylene cyanohydrin.

It is another object of the present invention to provide a process for the purification of dry acrylonitrile or acrylonitrile containing up to about 3.5% water at 25° C.

I have found that if concentrated acrylonitrile, such as that obtained in an ethylene cyanohydrin process, is treated first with decolorizing carbon and then with a cation exchange material and if additional water is added to the decolorizing carbon, a water-white, sparkling clear acrylonitrile product of a high degree of purity is obtained.

The invention will be described in greater detail in conjunction with the following specific example which is merely illustrative. It is not intended to limit the invention to the details of this example.

Example

A bed of cation exchange resin which is a sulfonated copolymer of divinylbenzene and styrene of the type described in U. S. Patent No. 2,366,007 and which has been completely activated for the removal of cations from solution by treatment with 60 lbs. of sulfuric acid as a 10% aqueous solution per cu. ft. of resin followed by rinsing to 0 parts per million (p. p. m.) of free mineral acidity (FMA) is placed in series with a bed of decolorizing carbon. Water-saturated acrylonitrile (about 96.5% acrylonitrile at about 20°–25° C.) prepared by dehydration of ethylene cyanohydrin and having a specific resistance of 72,000 ohms is passed first through the carbon bed (Bed I) and then through the bed of cation exchange resin (Bed II). From time to time the flow of acrylonitrile is stopped, a quantity of demineralized water is run through the carbon bed, and the inflow of acrylonitrile then resumed, and the purity of the effluent acrylonitrile is measured by its specific resistance. Acrylonitrile having a specific resistance between about 800,000 and 3,000,000 ohms is collected.

Details of the procedure and observations made follow:

| Volume (liters) of influent through Bed I | Specific resistance (ohms) of effluent from Bed I | Volume (liters) of influent through Bed II | Specific resistance (ohms) of effluent from Bed II |
|---|---|---|---|
| 0.10 | 360,000 | 0.05 | 2,800,000 |
| 0.58 | 198,000 | .98 | 680,000 |

Run temporarily discontinued, beds backwashed, run resumed with new influent acrylonitrile having a specific resistance of 68,000 ohms;

| | | 1.08 | 2,780,000 |
|---|---|---|---|
| 1.18 | 280,000 | 2.48 | 1,820,000 |
| 2.63 | 132,000 | 3.08 | 1,810,000 |
| 3.23 | 141,000 | 9.18 | 327,000 |
| 9.33 | 94,400 | 9.33 | 268,000 |

Flow of acrylonitrile stopped, quantity of 500,000 ohms demineralized water approximately equivalent to volume of Bed I added to Bed I, acrylonitrile inflow resumed;

| 10.18 | 113,000 | 10.03 | 2,680,000 |
|---|---|---|---|
| | | 10.79 | 1,315,000 |
| 10.94 | 80,000 | 11.34 | 530,000 |

Flow of acrylonitrile stopped, quantity of 500,000 ohms demineralized water approximately equivalent to volume of Bed I added to Bed I, run resumed with new acrylonitrile having a specific resistance of 107,000 ohms;

| | | 13.22 | 1,640,000 |
|---|---|---|---|
| 13.37 | 106,000 | 14.08 | 620,000 |
| 14.23 | 121,000 | 14.37 | 600,000 |

Flow of acrylonitrile stopped, quantity of 500,000 ohms demineralized water approximately equivalent to volume of Bed I added to Bed I, acrylonitrile inflow resumed;

| | | 14.51 | 1,290,000 |
|---|---|---|---|
| 14.66 | 223,000 | 19.21 | 158,000 |

Flow of acrylonitrile stopped, Bed I backwashed with purified acrylonitrile having a specific resistance of 910,000 ohms, acrylonitrile inflow resumed;

| | | 19.79 | 264,000 |
|---|---|---|---|
| 19.91 | 91,000 | | |

Flow of acrylonitrile stopped, Bed I backwashed with purified acrylonitrile having a specific resistance of 910,000, acrylonitrile inflow resumed;

| | | 20.24 | 268,000 |
|---|---|---|---|
| 20.36 | 94,000 | | |

Flow of acrylonitrile stopped, quantity of 500,000 ohms demineralized water approximately equivalent to volume of Bed I added to Bed I, acrylonitrile inflow resumed;

| | | 20.32 | 350,000 |
|---|---|---|---|
| 20.44 | 202,000 | 20.37 | 820,000 |
| Run discontinued. | | | |

Excess water present in the effluent as a result of the additions of demineralized water to the carbon Bed I may be readily separated from the acrylonitrile which has a specific gravity less than 1 and used to saturate more influent acrylonitrile.

It will be noted from the results of the above example that whenever the specific resistance of the effluent from the carbon bed drops, that of the effluent from the resin bed also drops. This indicates that the carbon bed is necessary to my process for purifying water-saturated acrylonitrile since it appears to remove something which the resin bed cannot. However, the carbon bed alone cannot produce a product of a specific resistance much above about 300,000 ohms whereas the two-bed system produces acrylonitrile having a specific resistance of close to 3,000,000.

As clearly established by the results of the above example, I have found that in order to maintain the desired degree of purity of product as evidenced by the high specific resistance of effluent from the system, quantities of demineralized water must be introduced into the system from time to time as the specific resistance drops off sharply. The need for this water in excess of the water of saturation of the acrylonitrile is apparently due to a slow dehydration of the beds by the acrylonitrile solution. The quantity of water added must be sufficient to re-hydrate the resin bed. This amount is conveniently measured as that quantity which will cause the specific resistance of the effluent acrylonitrile to increase to at least a value which is only slightly below the value from which it started to drop. Too much water is to be avoided since it will tend to dissolve some of the acrylonitrile and thus decrease the yield of the product. For optimum results, the water is added to the system just prior to the carbon bed.

The end point for my process will, of course, be determined by the quality of acrylonitrile desired. The choice of 800,000–1,000,000 ohms specific resistance as a minimum value will give a generally desirable effluent quality and an economically favorable capacity. Since after a sharp drop in specific resistance the high purity of acrylonitrile is not regained immediately after addition of water to the carbon bed, the water should be added before the minimum point of specific resistance is reached. For example, if acrylonitrile having a specific resistance between 1,000,000 and 3,000,000 ohms is desired, the water additions may advantageously be made whenever the specific resistance of the effluent from the system drops below about 1,500,000 ohms.

For most commercial applications, acrylonitrile having a specific resistance of from about 1,000,000 to 3,000,000 ohms is sufficiently pure. However, if an even purer product is required, it may be obtained by using substantially homogeneous mixture of cation and anion exchange materials in place of the cation exchange material alone. Thus, if water-saturated acrylonitrile having a resistance of 58,000 ohms is treated first with decolorizing carbon and then with a mixture of cation and anion exchange resins, a product of greater than 10,000,000 ohms specific resistance is obtained. It is interesting to note, in this connection, that reversal in the order of treatment, i. e., resin mixture followed by decolorizing carbon, results in a product of only 1,525,000 ohms specific resistance. Without the decolorizing carbon, the product has a specific resistance of about 1,800,000 ohms. Furthermore, as mentioned in the introductory discussion of the Blann process, anion exchange resin cannot be used alone as a separate treatment; it must be admixed with the cation exchange material if it is to be used at all.

Any anion exchange resin may be used in conjunction with a cation exchanger in proportions by volume ranging from 1:3 to 3:1, preferably 1:1, if this modification of my process is chosen. Examples of such anion exchangers include condensation products of polyalkylene polyamines, acetaldehyde and formaldehyde, condensation products of polyalkylene polyamines with acrylonitrile-ammonocarbonic acid adducts as described in U. S. Patent No. 2,473,498, condensation products of an aminotriazine, a guanido compound and an aldehyde as described in U. S. Patent No. 2,285,750, condensation products of aminotriazines, aldehydes and strongly basic non-aromatic amines as described in the copending application of James R. Dudley, Serial No.

649,127, filed February 20, 1946, biguanide-aldehyde condensation products insolubilized by urea- or aminotriazine-formaldehyde condensation products as described in U. S. Patent No. 2,251,234, crotonaldehyde, formaldehyde and polyalkylene polyamine condensation products, condensation products of polyepoxy compounds and polyamines as described in U. S. Patent No. 2,469,684, aldehyde condensation products of furyl aliphatic amines as described in the copending application of James R. Dudley, Serial No. 642,416, filed January 19, 1946, condensation products of glycerol dichlorhydrin and an alkylene polyamine as described in U. S. Patent No. 2,469,693, condensation products of urea, a guanido compound and an aldehyde as described in U. S. Patent No. 2,395,825, condensation products of polyacrylic acid with polyamines as described in the copending application of James R. Dudley, Serial No. 648,818, filed February 19, 1946, insolubilized polyamine-aldehyde condensation products as described in U. S. Patent Nos. 2,467,523, 2,485,485 and 2,515,116, etc. However, if the resins are not to be used soon after mixture thereof, it is well to bear in mind that some combinations of cation and anion exchange materials are more stable than others, see my copending application, Serial No. 87,353, filed April 13, 1949, U. S. Patent No. 2,515,142, dated July 11, 1950, the copending application of Alexander V. Alm, Serial No. 752,006, filed June 2, 1947, and the copending applications of Grace R. Stroh, Serial Nos. 751,971 and 751,973-5, all filed June 2, 1947.

Other cation exchange materials may be used in place of the sulfonated copolymer of the example. For example, the cation active resin may be a furfural-mineral acid halide condensation product as described in U. S. Patent No. 2,408,615, a sulfonated or phosphonated resinified furfural as described in the copending application of Jack T. Thurston, Serial No. 652,235, filed March 5, 1946, an aldehyde condensation product of a sulfonated hydroxy aromatic compound containing an activating group such as a ketone group as described in U. S. Patent No. 2,440,659, or the like. In addition, furfural or formaldehyde condensation products of the reaction product of acetone, furfural and sodium bisulfite as described in Patent No. 2,372,233, polyhydric phenolaldehyde condensation products such as the catechol tannin-formaldehyde condensation products, aromatic sulfonic acid condensation products as described in Patent Nos. 2,204,539, 2,230,641, 2,361,754, 2,477,328, and 2,497,054, carbonaceous substances, i. e., sulfated or sulfonated carbonaceous materials such as coal, peat, lignite, etc., may also be used.

Decolorizing agents other than charcoal may be used as, for example, activated alumina, the oxides of magnesium, calcium or barium, talcum, fuller's earth, pumice, powdered glass, sand, and the like. I prefer, however, use of a decolorizing carbon, some of the charcoal decolorizers suitable for use in the present invention being marketed under the trade names of "Nuchar," "Darco," "Norit," "Superfiltchar," and the like.

Regeneration of exhausted cation exchange materials may be accomplished by treating the material with dilute aqueous acid solutions of from 0.1 to 10% by weight concentration and subsequently washing with water until the material is substantially free of the acid used. The anion exchange resins are similarly treated, in the conventional manner, with alkali. The decolorizing agent may be regenerated by treatment with aqueous solutions of sodium or potassium hydroxides.

Other modifications in my process are, of course, possible and contemplated. For example, instead of periodically adding the water in excess of the water of saturation to the system as in the example, this water can be added continuously with the concentrated acrylonitrile. The continuous addition is particularly advantageous in large-scale operations.

The acrylonitrile to which the process of the present invention applies is that which contains either no water or any quantity of water up to its saturation point, i. e., about 3.5% water at 25° C.

It is surprising, in view of the Blann patent teaching, that when I omit the anion exchange resin bed of Blann's process to avoid polymerization of concentrated acrylonitrile (a problem not encountered with dilute aqueous solutions of acrylonitrile), the carbon bed then must precede the remaining cation exchanger whereas Blann found it necessary to treat dilute acrylonitrile first with the pair or pairs of ion exchangers and then with the carbon.

If the beds are reversed and concentrated acrylonitrile is treated, in accordance with the Blann teaching, first with a cation exchanger and then with a decolorizing carbon bed, the specific resistance of the effluent from the cation exchanger is greater than that from the carbon bed, i. e., about 1,800,000 ohms as contrasted with about 1,500,000 ohms, both values which correspond to those obtained if a mixture of cation and anion exchange material is substituted for the cation material alone, and purified acrylonitrile having a specific resistance of anything approaching about 3,000,000 ohms is unobtainable.

I claim:

1. A process which comprises passing a quantity of acrylonitrile containing water up to its saturation point through, and in contact with, first a bed of decolorizing material and then a bed containing a cation exchange material active for the removal of cations from solution until the specific resistance of the effluent begins to drop off rapidly from the upper value of a pre-determined range, introducing into the system through the bed of decolorizing material a quantity of demineralized water sufficient to cause a substantially sharp increase in the specific resistance of effluent acrylonitrile within said range after resumption of the flow of acrylonitrile, resuming inflow of said acrylonitrile, and collecting effluent acrylonitrile having a specific resistance of not less than the lower value of said pre-determined range.

2. A process which comprises passing a quantity of acrylonitrile containing water up to its saturation point through, and in contact with, first a bed of decolorizing material and then a bed containing a cation exchange material active for the removal of cations from solution until the specific resistance of the effluent begins to drop off rapidly from the upper value of a pre-determined range, introducing into the system through the bed of decolorizing material a volume of demineralized water substantially equivalent to the volume of said bed of decolorizing material, resuming inflow of said acrylonitrile, and collecting effluent acrylonitrile having a specific resistance of not less than the lower value of said pre-determined range.

3. A process in accordance with claim 1 wherein the predetermined range is about 800,000 to 3,000,000 ohms.

4. A process in accordance with claim 1 wherein the cation exchange material is a sulfonated copolymer of styrene and divinylbenzene.

5. A process in accordance with claim 1 wherein the bed containing cation exchange material contains a homogeneous mixture of cation exchange material and anion exchange resin active for the removal of anions from solution.

JACQUELINE OSBORNE.

REFERENCES CITED

The following references are of record in the file of this patent:

UNITED STATES PATENTS

| Number | Name | Date |
|---|---|---|
| 2,191,365 | Boyd | Feb. 20, 1940 |
| 2,444,589 | Blann | July 6, 1948 |
| 2,500,403 | Davis et al. | Mar. 14, 1950 |